United States Patent
Yao

(10) Patent No.: US 10,880,495 B2
(45) Date of Patent: Dec. 29, 2020

(54) VIDEO RECORDING METHOD AND APPARATUS, ELECTRONIC DEVICE AND READABLE STORAGE MEDIUM

(71) Applicant: BAIDU ONLINE NETWORK TECHNOLOGY (BEIJING) CO., LTD., Beijing (CN)

(72) Inventor: Miao Yao, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 0 days.

(21) Appl. No.: 16/512,718

(22) Filed: Jul. 16, 2019

(65) Prior Publication Data

US 2020/0077035 A1 Mar. 5, 2020

(30) Foreign Application Priority Data

Aug. 28, 2018 (CN) .......................... 2018 1 0985329

(51) Int. Cl.
*H04N 5/272* (2006.01)
*G06K 9/00* (2006.01)
*H04N 21/431* (2011.01)

(52) U.S. Cl.
CPC ......... *H04N 5/272* (2013.01); *G06K 9/00228* (2013.01); *G06K 9/00288* (2013.01); *G06K 9/00744* (2013.01); *H04N 21/4318* (2013.01)

(58) Field of Classification Search
CPC ........... H04N 5/265; H04N 5/272–275; H04N 2005/2726
See application file for complete search history.

(56) References Cited

U.S. PATENT DOCUMENTS 9,992,450 B1 * 6/2018 Yuan .................. G06K 9/38
2014/0362163 A1 * 12/2014 Winterstein ........... G06T 5/002
348/14.07

(Continued)

FOREIGN PATENT DOCUMENTS

CN 102750465 A 10/2012
CN 105450971 A 3/2016

(Continued)

OTHER PUBLICATIONS

Notice of Allowance dated Dec. 24, 2019 of Corresponding Chinese Application No. 201810985329.6, 4 pages.

(Continued)

*Primary Examiner* — Paul M Berardesca
(74) *Attorney, Agent, or Firm* — Dilworth IP, LLC

(57) ABSTRACT

A video recording method and apparatus, an electronic device and a readable storage medium, which realize positioning of a privacy background by acquiring a sensitive video frame containing a privacy background image from the recorded video information; acquire an image region of the privacy background image in the sensitive video frame; superimpose an augmented reality AR occlusion image on the image region of the privacy background image to obtain an occlusion frame in which the privacy background image is occluded, so as to realize the hiding of the privacy background image by occluding part of the background; obtain live video information according to the recorded video information and the occlusion frame, thereby improving the reliability of real time occlusion of objects that need to be hidden, during video recording.

17 Claims, 6 Drawing Sheets

(56) References Cited

U.S. PATENT DOCUMENTS

| | | | |
|---|---|---|---|
| 2015/0220777 A1* | 8/2015 | Kauffmann | H04N 5/2621 |
| | | | 382/103 |
| 2015/0365627 A1* | 12/2015 | Deng | H04N 7/147 |
| | | | 348/14.07 |
| 2016/0104035 A1 | 4/2016 | Wang et al. | |
| 2017/0140543 A1* | 5/2017 | Eliraz-Levonai | G06T 7/194 |
| 2017/0289623 A1* | 10/2017 | Bailey | G06F 3/011 |
| 2018/0047196 A1* | 2/2018 | Du | G06F 21/6209 |
| 2019/0042871 A1* | 2/2019 | Pogorelik | G06K 9/40 |

FOREIGN PATENT DOCUMENTS

| | | |
|---|---|---|
| CN | 105959421 A | 9/2016 |
| CN | 106358069 A | 1/2017 |
| CN | 106529565 A | 3/2017 |
| CN | 107358111 A | 11/2017 |
| CN | 107438161 A | 12/2017 |
| CN | 107767392 A | 3/2018 |
| CN | 107886117 A | 4/2018 |
| CN | 108257104 A | 7/2018 |

OTHER PUBLICATIONS

Notice of Publication dated Jan. 31, 2020 of Corresponding Chinese Application No. 201810985329.6, 22 pages.
Office Action dated Jun. 26, 2019 of corresponding Chinese application No. 201810985329.6; 9 pages.

* cited by examiner

VIDEO RECORDING METHOD AND APPARATUS, ELECTRONIC DEVICE AND READABLE STORAGE MEDIUM

CROSS-REFERENCE TO RELATED APPLICATIONS

This application claims priority to Chinese Patent Application No. 201810985329.6, filed on Aug. 28, 2018, which is hereby incorporated by reference in its entirety.

FIELD

The present disclosure relates to the field of image processing technologies, and in particular, to a video recording method and apparatus, an electronic device, and a readable storage medium.

BACKGROUND

With the development of network technology, the application of the network live broadcast platform is more and more extensive, and more users can participate in the network live broadcast as an anchor. For example, a shop seller user conducts a live broadcast of a product display, and a visitor user conducts a live broadcast of a travel and sightseeing display. Since the video recording process may capture the privacy items of the anchor, other people who are not well dressed, or other images that the anchor does not wish to be broadcasted and that need to hide, it is necessary to perform occlusion processing during the video recording process.

Usually, the existing methods can only rely on the anchor to select a live place with a clean background before recording a video, or to perform artificial occlusion timely during the live broadcast.

However, during the live broadcast process, concealment may not be effective or occlusion cannot be performed effectively. For example, during the live broadcast of the reality show, the lens moves with the anchor, and it is difficult to form an effective occlusion during the live broadcast. Therefore, the existing video recording method cannot form a reliable occlusion of the object to be hidden.

SUMMARY

The present disclosure provides a video recording method and apparatus, an electronic device and a readable storage medium, to improve the reliability of real-time occlusion of objects to be hidden during video recording.

According to a first aspect of the present disclosure, a video recording method is provided, including:

acquiring a sensitive video frame containing a privacy background image from recorded video information;

acquiring an image region of the privacy background image in the sensitive video frame;

superimposing an augmented reality AR occlusion image on the image region of the privacy background image to obtain an occlusion frame in which the privacy background image is occluded;

obtaining live video information according to the recorded video information and the occlusion frame.

Optionally, in a possible implementation of the first aspect, before the superimposing an augmented reality AR occlusion image on the image region of the privacy background image to obtain an occlusion frame in which the privacy background image is occluded, the method further includes:

determining a background type of the sensitive video frame according to a plurality of consecutive video frames including the sensitive video frame;

acquiring the AR occlusion image according to the background type.

Optionally, in another possible implementation of the first aspect, the acquiring the AR occlusion image according to the background type includes:

acquiring surrounding color information of the privacy background image when determining that the background type is a dynamic background type;

determining a hidden color according to the surrounding color information;

acquiring the AR occlusion image according to the hidden color, with a main color of the AR image being the hidden color.

Optionally, in still another a possible implementation of the first aspect, the acquiring the AR occlusion image according to the hidden color, with the main color of the AR image being the hidden color, includes:

acquiring an AR image a main color of which is the hidden color;

processing the AR image to obtain an AR occlusion image having an outer boundary shape that matches the contour shape of the image region.

Optionally, in a further possible implementation of the first aspect, the acquiring the AR occlusion image according to the background type includes:

acquiring a surrounding image of the privacy background image when determining that the background type is a static background type;

determining a repeatable partial image in the surrounding image;

taking the repeatable partial image, or a combined image of a plurality of the repeatable partial images as the AR occlusion image.

Optionally, in a further possible implementation of the first aspect, the acquiring a sensitive video frame containing a privacy background image from recorded video information includes:

parsing the recorded video information to obtain at least one original video frame;

acquiring a video background image in the at least one original video frame;

acquiring the privacy background image in the video background image;

determining an original video frame corresponding to the privacy background image to be the sensitive video frame.

Optionally, in a further possible implementation of the first aspect, the acquiring a video background image in the at least one original video frame includes:

acquiring face information of a user;

determining a face image corresponding to the face information in the at least one original video frame;

determining a person image region corresponding to the face image in each of the original video frame according to the face image;

determining, in each of the original video frame, the person image region to be a foreground image, and determining a remaining image region to be a video background image.

Optionally, in a further possible implementation of the first aspect, the acquiring a privacy background image in the video background image includes:

performing semantic segmentation of object image on the video background image to obtain object semantic information;

determining the object semantic information that is the same as privacy semantic information to be privacy object semantic information;

determining an object image corresponding to the privacy object semantic information to be the privacy background image.

Optionally, in further possible implementation of the first aspect, before the determining the object semantic information that is the same as the privacy semantic information to be privacy object semantic information, the method further includes:

acquiring a hidden instruction of a user history input, where the hidden instruction is used to indicate a new privacy background image;

acquiring historical privacy object semantic information corresponding to each of the new privacy background images;

taking the historical privacy object semantic information to be privacy semantic information;

correspondingly, before the acquiring a hidden instruction of a user history input, the method further includes:

when the recorded video information is acquired, synchronously displaying the recorded video information to a user;

when the hidden instruction input by the user for the video background image is received, determining an indicated image region corresponding to the hidden instruction to be the new privacy background image.

According to a second aspect of the present disclosure, a video recording apparatus is provided, including:

an acquiring module, configured to acquire a sensitive video frame containing a privacy background image from recorded video information;

a positioning module, configured to acquire an image region of the privacy background image in the sensitive video frame;

an AR occlusion module, configured to superimpose an augmented reality AR occlusion image on the image region of the privacy background image to obtain an occlusion frame in which the privacy background image is occluded;

a video synthesizing module, configured to obtain live video information according to the recorded video information and the occlusion frame.

Optionally, in a possible implementation of the second aspect, before the superimposing an augmented reality AR occlusion image in the image region of the privacy background image to obtain an occlusion frame in which the privacy background image is occluded, the AR occlusion module is further configured to:

determine a background type of the sensitive video frame according to a plurality of consecutive video frames including the sensitive video frame; acquire the AR occlusion image according to the background type.

Optionally, in another possible implementation of the second aspect, the AR occlusion module is specifically configured to:

acquire surrounding color information of the privacy background image when determining that the background type is a dynamic background type; determine a hidden color according to the surrounding color information; acquire an AR occlusion image according to the hidden color, with a main color of the AR image being the hidden color.

Optionally, in still another possible implementation of the second aspect, the AR occlusion module is specifically configured to:

acquire an AR image a main color of which is the hidden color; process the AR image to obtain an AR occlusion image having an outer boundary shape that matches the contour shape of the image region.

Optionally, in a further possible implementation of the second aspect, the AR occlusion module is specifically configured to:

acquire a surrounding image of the privacy background image when determining that the background type is a static background type; determine a repeatable partial image in the surrounding image; taking the repeatable partial image, or a combined image of a plurality of the repeatable partial images to be the AR occlusion image.

Optionally, in a further possible implementation of the second aspect, the acquiring module is configured to:

parse the recorded video information to obtain at least one original video frame;

acquire a video background image in the at least one original video frame; acquire the privacy background image in the video background image; determine an original video frame corresponding to the privacy background image to be a sensitive video frame.

Optionally, in a further possible implementation of the second aspect, the acquiring module is specifically configured to:

acquire face information of a user; determine a face image corresponding to the face information in the at least one original video frame; determine a person image region corresponding to the face image in each of the original video frame according to the face image; determine the person image region to be a foreground image, and determine a remaining image region to be a video background image in each of the original video frame.

Optionally, in a further possible implementation of the second aspect, the acquiring module is specifically configured to:

perform semantic segmentation of object image on the video background image to obtain object semantic information; determine the object semantic information that is the same as privacy semantic information to be privacy object semantic information; determine an object image corresponding to the privacy object semantic information to be the privacy background image.

Optionally, in a further possible implementation of the second aspect, before the determining the object semantic information that is the same as the privacy semantic information to be privacy object semantic information, the acquiring module is further configured to:

acquire a hidden instruction of a user history input, where the hidden instruction is used to indicate a new privacy background image; acquire historical privacy object semantic information corresponding to each of the new privacy background image; take the historical privacy object semantic information to be the privacy semantic information;

correspondingly, before the acquiring a hidden instruction of a user history input, the acquiring module is further configured to:

when the recorded video information is acquired, synchronously display the recorded video information to a user; when the hidden instruction input by the user for the video background image is received, determine an indicated image region corresponding to the hidden instruction to be the new privacy background image.

According to a third aspect of the present disclosure, an electronic device is provided, including: a memory, a processor, and a computer program, the computer program is stored in the memory, and the processor runs the computer program to perform the video recording method of the first aspect and various possible designs of the first aspect of the present disclosure.

According to a fourth aspect of the present disclosure, a readable storage medium is provided, a computer program is stored in the readable storage medium, and the computer program, when executed by the processor, is used to implement the video recording method of the first aspect and various possible designs of the first aspect of the present disclosure.

The present disclosure provides a video recording method, apparatus, electronic device and readable storage medium, which realize a positioning of a privacy background by acquiring a sensitive video frame containing a privacy background image from the recorded video information; acquire an image region of the privacy background image in the sensitive video frame; superimpose an augmented reality AR occlusion image on the image region of the privacy background image to obtain an occlusion frame in which the privacy background image is occluded, so as to realize the hiding of the privacy background image by occluding part of the background; and obtain live video information according to the recorded video information and the occlusion frame, thereby realizing real time processing of the privacy background of the recorded video information involving sensitive privacy objects and others who are not well dressed, and realizing the dynamic hiding of the privacy background image in the background of each frame, thereby improving the reliability of real time occlusion of hidden objects during video recording.

DETAILED DESCRIPTION

Figure 1:
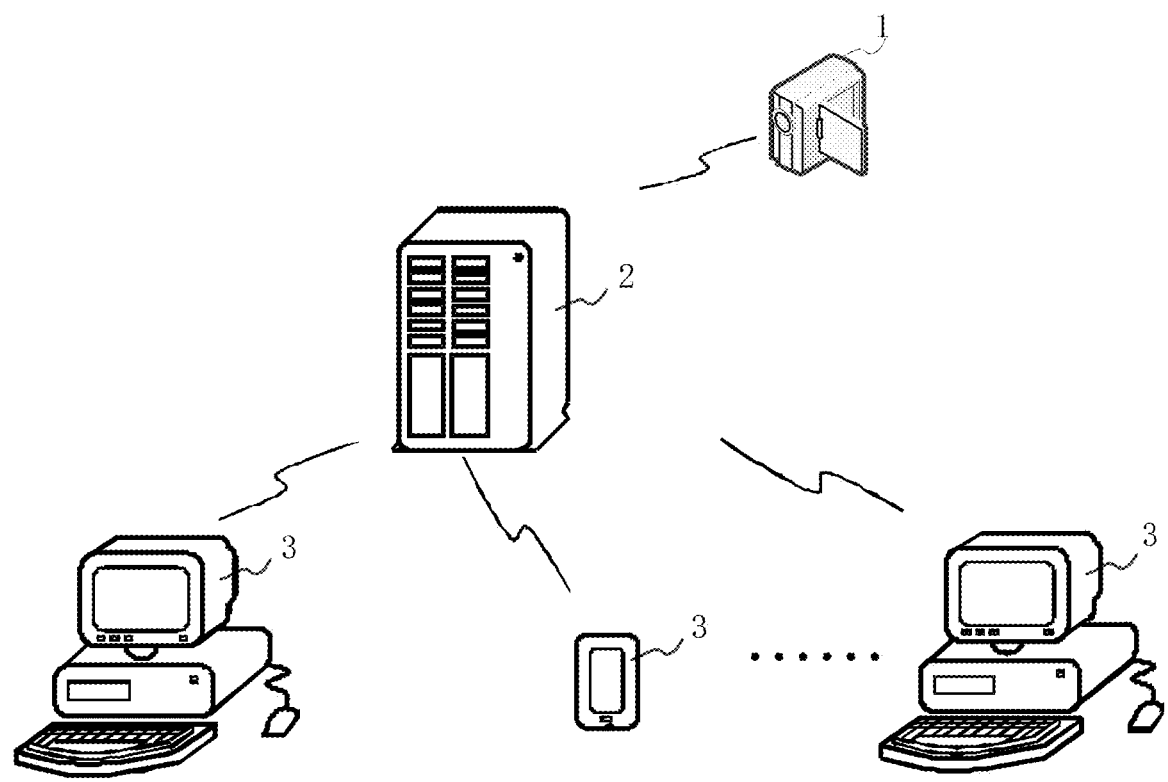
FIG. 1 is a schematic diagram of an application scenario according to an embodiment of the present disclosure.

In order to more clearly illustrate the embodiments of the present disclosure or the technical solutions in the prior art, the drawings used in the embodiments or the prior art description will be briefly described below. Obviously, the drawings in the following description are some of the embodiments of the present disclosure, and other drawings can be obtained according to the drawings without any creative efforts for those skilled in the art.

It should be understood that, in various embodiments of the present disclosure, the sequence numbers of the processes does not imply a sequence of executions, and the order of execution of the processes should be determined by its function and internal logic, and is not intended to limit the implementation process of the embodiment of the present disclosure in any way.

It should be understood that in the present disclosure, "include" and "have" and any variations thereof are intended to cover a non-exclusive inclusion, for example, a process, method, system, product, or device that includes a series of steps or units is not necessarily limited those steps or units that are clearly listed, but may include other steps or units that are not explicitly listed or inherent to such processes, methods, products, or devices.

It should be understood that in the present disclosure, "a plurality" means two or more. "And/or" is merely an association relationship describing associated objects, indicating that there may be three relationships, for example, and/or B, which may indicate that A exists separately, A and B exist simultaneously, and B exists separately. The character "/" generally indicates that the contextual object is an "or" relationship. "Include A, B and C" and "include A, B, C" means that A, B, and C are all included, and "include A, B or C" means including one of A, B, and C. "Include A, B and/or C" means including any one or two or three of A, B and C.

It should be understood that in the present disclosure, "B corresponding to A", "B that is corresponding to A", "A corresponds to B" or "B corresponds to A" means that B is associated with A, B can be determined according to A. Determining B according to A does not mean that B is only determined based on A, and B can also be determined based on A and/or other information.

Depending on the context, "if" as used herein may be interpreted as "when" or "while" or "in response to determining" or "in response to detecting."

The technical solutions of the present disclosure will be described in detail below with specific embodiments. The following specific embodiments may be combined with each other, and the same or similar concepts or processes may not be described in some embodiments.

In the embodiment of the present disclosure, a video frame refers to a picture constituting a video. The video can be regarded as a sequence of pictures composed of a plurality of video frames in order. The playing of the video can be understood as sequentially displaying the video frames in the sequence of the pictures. Since the display frequency of the video frames is larger than the range identifiable by the human eye, a continuously changing video picture seen by the human eye is formed.

FIG. 1 is a schematic diagram of an application scenario provided by an embodiment of the present disclosure. The application scenario shown in FIG. 1 is video recording in a live broadcast scenario, and a video recording terminal 1 records a video frame of the anchor and uploads it to a server 2 of a live broadcast site in real time. The server 2 forwards the received video frame to at least one viewing client 3. A user views a live broadcast corresponding to the video frame by logging in to the live broadcast website or an application program through the viewing client 3. The process of the video recording terminal 1 forwarding the video frame to the server 2 may be a forwarding process of delayed transmission, that is, the video frame recorded in real time is cached in the video recording terminal 1 first, and a video stream file is obtained when a certain buffer time for accumulation or a buffer data amount is reached, and the video stream file is transmitted to the viewing client 3. The video recording terminal 1 continues to accumulate for a next video stream file. Therefore, the server 2 can obtain a video stream file corresponding to a time period. Similarly, the server 2 may forward the video frame to the viewing client 3 in a manner of delayed transmission, that is, the server may cache video frames in the server 2, obtain a video stream file when a certain buffer time for accumulation or a buffer data amount is reached, transmit the video stream file to the viewing client 3, and the server 2 continues to accumulate for the next video stream file. Therefore, the viewing client 3 can obtain a video stream file corresponding to a time period. In the above live broadcast scenario, the video recording method of the present disclosure may be applied to the video recording terminal 1 and/or the server 2.

In one implementation, video recording may be performed mainly by the video recording terminal 1. For example, the video recording terminal 1 may be configured with a computer program and related parameters for video recording, and the video recording terminal 1 processes a video immediately when the live video is captured, for example, performing recognition and occlusion processing on the privacy background image in real time and then uploading to the server 2, and the server 2 can forward it to the viewing client 3 after other real-time approval.

In another implementation, video recording may be performed mainly by the server 2. For example, the server 2 may perform real-time recognition and occlusion on the privacy background image when receiving the live video uploaded by the video recording terminal 1, and send the processed video information to the viewing client 3. Since the server 2 usually has a relatively strong data processing capability and analysis capability, and the amount of collected data is large, so centralized processing has high efficiency.

The steps of the video recording method in the present disclosure may also be performed jointly by both the video recording terminal 1 and the server 2. For example, some of the steps in the video processing method in the following embodiments of the present disclosure may be implemented by the video recording terminal 1 and other part of the steps may be implemented by the server 2. The present disclosure does not limit whether the execution subject of the video recording method is a single entity or a distributed system.

Figure 2:
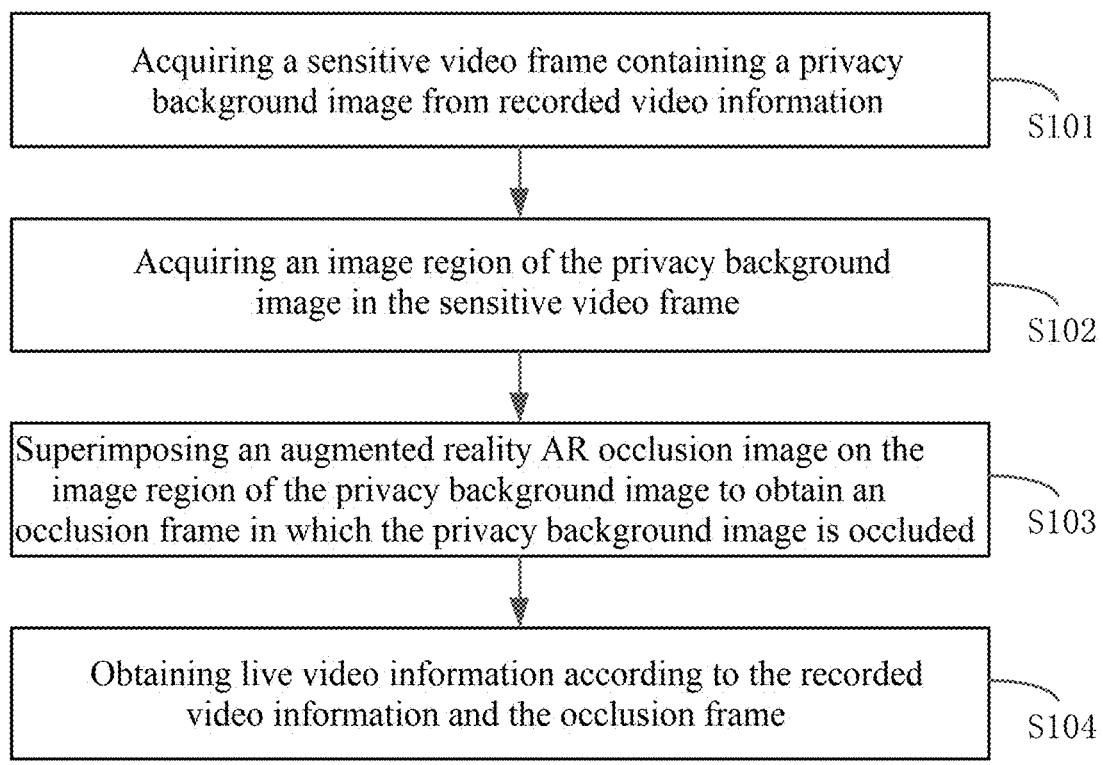
FIG. 2 is a schematic flowchart of a video recording method according to an embodiment of the present disclosure.

FIG. 2 is a schematic flowchart of a video recording method according to an embodiment of the present disclosure. The execution subject of the method shown in FIG. 2 may be software and/or a hardware device, such as the video recording terminal and/or server shown in FIG. 1. The method shown in FIG. 2 includes steps S101 to S104, as follows:

S101, acquiring a sensitive video frame containing a privacy background image from recorded video information.

It can be understood that the recorded video information is acquired from the cache of the video recording terminal or the cache of the server. Video information may be understood as a video stream file that is played from a breakpoint, that is, a part of a complete video file; it may also be understood as a complete video. A sensitive video frame can be understood as a picture, and the manner of obtaining a sensitive video frame can be obtaining by means of picture recognition and picture classification. For example, for each video frame of the video information, an image classification algorithm (for example, Deep CNNs algorithm) or an object detection algorithm (for example, Fast RCNN algorithm, or Faster RCNN algorithm) is used to perform image-based picture classification, and whether each video frame belongs to a normal class or a to-be-hidden class is obtained, the video frame belonging to the to-be-hidden class is taken as a sensitive video frame. For another example, for each video frame of the video information, a semantic segmentation algorithm (for example, FCN algorithm) or an instance segmentation algorithm (for example, Mask RCNN algorithm) is used to perform a pixel-based picture classification, and whether each video frame belongs to a normal class or a to-be-hidden class is obtained, the video frame belonging to the to-be-hidden is taken as a sensitive video frame, and a location of the privacy background image in the sensitive video frame is identified. The recognition models that may be used in various algorithms can be obtained by learning and training with historical manual marked samples.

S102, acquiring an image region of the privacy background image in the sensitive video frame.

Specifically, the image region can be understood as a location area of pixels displaying the privacy background image, on the sensitive video frame.

S103, superimposing an augmented reality AR occlusion image on the image region of the privacy background image to obtain an occlusion frame in which the privacy background image is occluded.

It can be understood that the AR occlusion image is acquired first, and then the AR occlusion image is superimposed on the image region of the privacy background image, so that the AR occlusion image and the sensitive video frame are combined to obtain the occlusion frame in which the privacy background image is occluded. The AR occlusion image may be an image that is similar to the image near the image region, so that the AR occlusion image is merged with an image region surrounding the privacy background image of the sensitive video frame, and does not appear too abrupt.

In order to make the AR occlusion image in the occlusion frame not too abrupt, the process of acquiring the AR occlusion image should make a selection with reference to the background feature of the sensitive video frame. An optional implementation is as follows.

Firstly, a background type of the sensitive video frame is determined according to a plurality of consecutive video frames including the sensitive video frame. Then, an AR occlusion image is acquired according to the background type. For example, in a plurality of consecutive video frames, it is detected that most area of the background image is a same image, and the background type is determined to be a static background type. It can be understood that in the indoor live broadcast, the camera is usually not moved, and only the anchor itself moves, or part of objects that serves as background is moved (for example, a displayed item is taken out of the range of a camera or taken into the range of the camera), so that the background of multiple consecutive video frames is the same image, such as walls, curtains, shop shelves, and so on. For another example, in multiple consecutive video frames, the background image is detected to be a constantly changing image, and the background type is determined to be a dynamic background type. It can be understood that in the live broadcast of a travel, it is usually necessary to continuously move the camera to follow the anchor, and thus the background of the obtained multiple consecutive video frames is different images, such as changing street view, changing landscapes, changing shop images during a journey, and the like. In the same live video, it is also possible that the video frames for a time period belong to the dynamic background type, and the video frames for another time period belong to the static background type. Here, the determination of the background type is performed only to the video frame that includes a sensitive video frame.

It can be understood that under the dynamic background type, the background is constantly changing, and the viewer has low attention to the image of a local area in the dynamic background. Therefore, a color patch or image that has a similar color to the surrounding image can be used as an AR occlusion image to roughly occlude the privacy background image in dynamic change. Moreover, the background is constantly changing, which leads to the need to continuously acquire new AR occlusion images, and therefore only performing color-related coarse occlusion can improve the acquisition speed of the AR occlusion images, thereby improving the occlusion efficiency.

Specifically, in an implementation of the dynamic background type, surrounding color information of the privacy background image may be acquired when it is determined that the background type is the dynamic background type. The surrounding color information can be understood as color information around the privacy background image in the sensitive video frame. For example, in a live broadcast in beach landscape, a privacy background image of a naked figure lying on the beach is detected, then the color of the white sand beach around the person image is determined to be the surrounding color information. Then, a hidden color is determined according to the surrounding color information. The surrounding color information can be understood as information including hue, lightness and chroma. Finally, an AR occlusion image is acquired according to the hidden color, where a main color of the AR image is the hidden color. The main color can be understood as the color that accounts for the largest proportion of the entire AR image. For example, a beige rectangular color block is directly used as an AR occlusion image for the naked figure on the beach; or a piece of screenshot that shows a beach having the same color is used as an AR occlusion image for the naked figure on the beach. Generally, the AR image searched according to the color may not conform to the shape requirement of the privacy background image, and thus, after obtaining the hidden color, an AR image whose main color is the hidden color is acquired first, then the AR image is processed to obtain an AR occlusion image having an outer boundary shape that matches the contour shape of the image region, thereby obtaining an AR occlusion image with a matching shape, avoiding occlusion on the image of normal region in subsequent occlusion, and reducing the influence on the live broadcast.

It can be understood that under the static background type, the background is almost fixed, and the viewer will have a higher level of attention to the static image displayed for a long time. Therefore, relatively accurate occlusion of the privacy background image in the static background type is required. And because the background in the static background class is almost unchanged, a same AR occlusion image can be used for the privacy background image of consecutive multiple sensitive video frames.

Specifically, in an implementation of the static background type, a surrounding image of the privacy background image may be acquired when it is determined that the background type is the static background type. For example, the privacy background image is anchor's family photo hanging on the wall, and then the image of the wallpaper around the photo frame is acquired. Then, a repeatable partial image in the surrounding image is determined. For example, a repeating pattern of the wallpaper is acquired. The repeatable partial image, or a combined image of a plurality of the repeatable partial images is taken as an AR occlusion image. For example, the repeating pattern of the wallpaper, or a combination result of multiple repeating patterns of the wallpaper, is taken as an AR occlusion image.

S104, obtaining live video information according to the recorded video information and the occlusion frame.

It can be understood that, in the recorded video information, each sensitive video frame is replaced with its corresponding occlusion frame to obtain the processed live video information.

The video recording method provided in this embodiment obtains a positioning of a privacy background by acquiring a sensitive video frame containing a privacy background image from the recorded video information, acquires an image region of the privacy background image in the sensitive video frame, superimposes a augmented reality AR occlusion image on an image region of the privacy background image to obtain an occlusion frame in which the privacy background image is occluded so as to realize the hiding of the privacy background image by occluding part of the background, and obtains live video information according to the recorded video information and the occlusion frame, thereby realizing real time processing of the privacy background in the recorded video information involving sensitive privacy objects and others who are not well dressed, realizing the dynamic hiding of the privacy background image in each frame background, and thus improving the reliability of real time occlusion of hidden objects during video recording.

Figure 3:
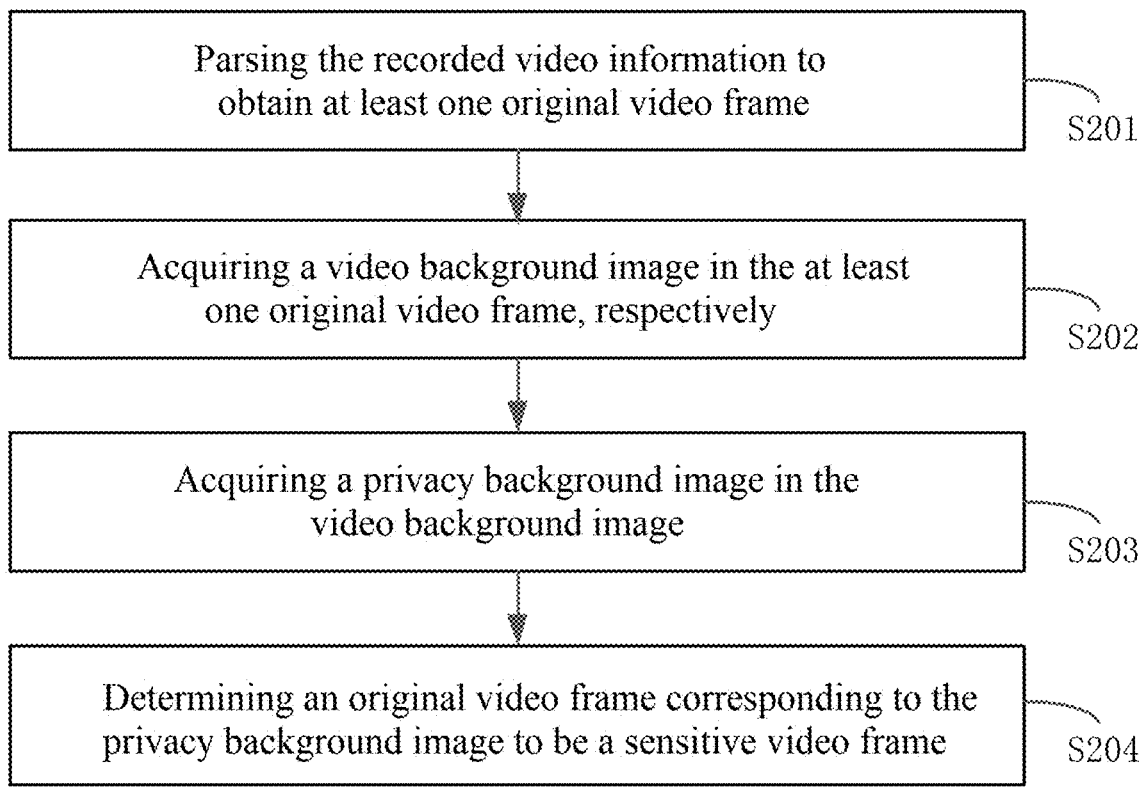
FIG. 3 is a schematic flowchart of an optional implementation of step S101 in FIG. 2 according to an embodiment of the present disclosure.

Optionally, there may be various implementations for step S101 (acquiring a sensitive video frame including a privacy background image from the recorded video information) in the embodiment shown in FIG. 2. Referring to FIG. 3, it is a schematic flowchart of an alternative implementation of step S101 in FIG. 2 provided by an embodiment of the present disclosure. The method shown in FIG. 3 mainly includes steps S201 to S204, as follows:

S201, parsing the recorded video information to obtain at least one original video frame.

The recorded video information can be understood as being composed of a plurality of original video frames from which at least one original video frame can be parsed.

S202, acquiring a video background image in the at least one original video frame, respectively.

Figure 4:
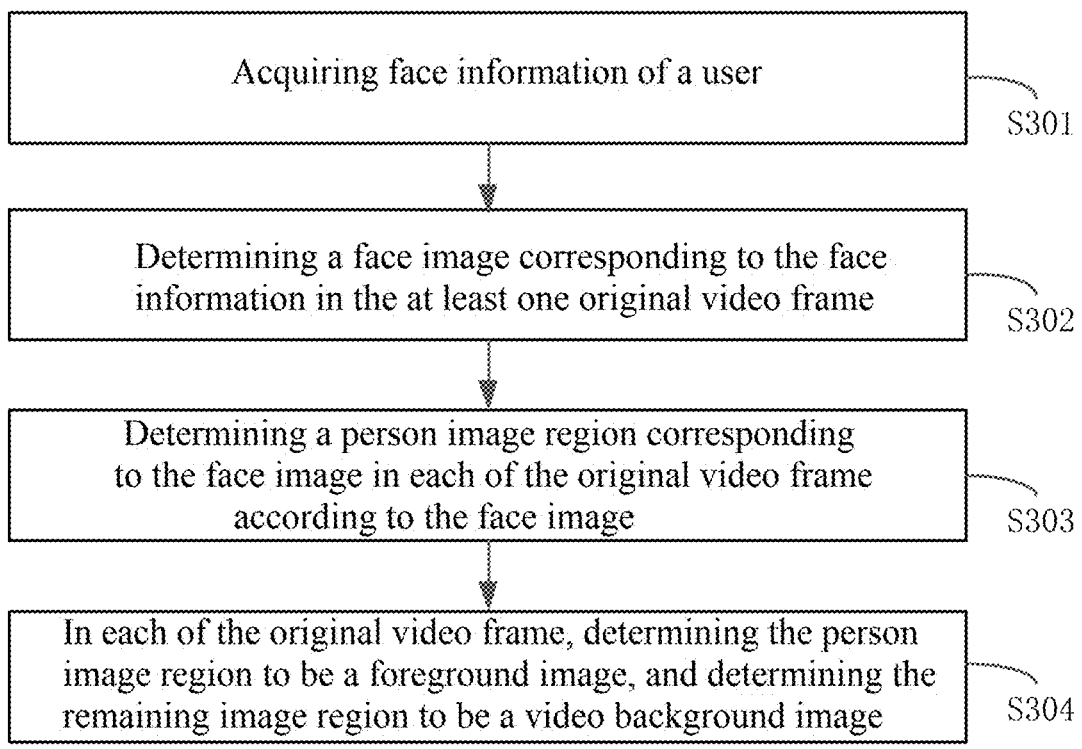
FIG. 4 is a schematic flowchart of an optional implementation of step S202 in FIG. 3 according to an embodiment of the present disclosure.

The video background image may be acquired from the obtained at least one original video frame by image recognition, background recognition, or the like. There are a plurality of ways to obtain the video background image. Referring to FIG. 4, it is a schematic flowchart of an optional implementation of step S202 in FIG. 3 according to an embodiment of the present disclosure. A method for obtaining a video background image in a video recording process will be described below with reference to FIG. 4 and an embodiment. The method shown in FIG. 4 mainly includes steps S301 to S304, as follows:

S301, acquiring face information of a user.

The user here can be understood as the anchor recording the video, such as a seller anchor in a live broadcast video of shopping, an anchor in a live broadcast of travel. The face information can be understood as a face image, and can also be understood as feature information of a face in a face image. There are several ways to obtain the user's face information. Take two alternative implementations as examples:

In an implementation, the user may pre-record his or her face information before starting the video, and only the pre-stored face information needs to be acquired to obtain the user's face information.

In another implementation, it may be that consecutive multiple original video frames in the beginning part of the complete video to which the video information belongs are obtained, and then the biggest face image that appears the most is obtained from consecutive multiple original video frames (e.g., the first 200 original video frames) in the beginning portion. The biggest face image can be understood as the face image closest to the camera, and the anchor usually appears first when the video starts, to introduce himself or herself, or to adjust the camera's position, so the face closest to the camera is likely to be the user's face. Finally, the user's face information is determined according to the biggest face image that appears the most. For example, if the face information is a face image, then the biggest face image that appears the most is directly used as the face image of the user. For another example, the face information is face feature information, and then feature information of the biggest face image that appears the most is used as the face feature information of the user.

S302, determining a face image corresponding to the face information in the at least one original video frame.

It can be understood that face search is performed in each original video frame with the face information of the user to determine the face image of the user in each original video frame.

S303, determining a person image region corresponding to the face image in each of the original video frame according to the face image.

The person image region can be understood as a body region including the face image of the user, and can also be understood as a body region having a correspondence relationship with the face image of the user. For example, a body part image is detected in a lower region adjacent to the face image, and then the position of the face image and the body part image is taken as the person image region. For another example, when the anchor turns his head to have his back or side to the camera, target object tracking and association may be performed according to the person image region in the previous video frame, thereby, in the original video frame without the face image of the user, the person image corresponding to the face image is determined and the position of the person image is taken as the person image region.

S304, in each of the original video frame, determining the person image region to be a foreground image, and determining the remaining image region to be a video background image.

For example, in the live broadcast video of travel, the travel anchor is taken as the foreground image, while other attraction buildings, objects and images of other tourists entering the lens are extracted as video background images. By determining the video background image with the user's face information, a fast separation of the foreground image and the video background image can be achieved, and the accuracy of extracting the video background image is improved.

After acquiring the video background image, continue to determine the sensitive video frame by the following steps.

S203, acquiring a privacy background image in the video background image.

Specifically, semantic segmentation of object image may be performed on the video background image to obtain object semantic information. For example, the obtained object semantic information includes "family photo", "product 105", "hanger", and "non-live goods underwear". Then the object semantic information that is the same as privacy semantic information is determined to be privacy object semantic information. The privacy semantic information may be preset or may be other semantic information that is irrelevant to the product of live broadcast (for example, in a live video in which the product of live broadcast is a cosmetic such as a lipstick, a powder cake, an eyebrow pencil, etc., non-cosmetic semantics detected is regarded as privacy semantic information). Finally, an object image corresponding to the privacy object semantic information is determined to be a privacy background image. For example, the privacy semantic information includes "underwear" and "photo", then the object images corresponding to "family photo" and "non-live goods underwear" are privacy background images that need to be hidden.

The privacy semantic information may be automatically learned according to a history instruction. Specifically, during live recording, the recorded video information may be synchronously displayed to the user when the recorded video information is acquired. If the anchor finds that some content that he is not willing to broadcasted is captured during video recording and there is no automatic occlusion, a hidden instruction may be input manually for the privacy background image that needs to be occluded. For example, an image region that needs to be occluded may be marked by dragging a mouse on the display or touching, to generate a hidden instruction for a new privacy background image. And when the hidden instruction input by the user for the video background image is received, an indicated image region corresponding to the hidden instruction is determined to be a new privacy background image. On this basis, there may be a corresponding process of acquiring privacy semantic information: first, acquiring a hidden instruction of a user history input, where the hidden instruction is used to indicate a new privacy background image; then, acquiring historical privacy object semantic information corresponding to each new privacy background image; and finally, taking the historical privacy object semantic information to be the privacy semantic information. For example, in a hidden instruction of the user history input, the family photo in the background is indicated as a new privacy background image, so "family photo" is added to the privacy semantic information. Thereby, the privacy semantic information can be intelligently determined according to the historical operation of the user, the adaptability to the user's needs is improved, and the user experience is improved.

S204, determining an original video frame corresponding to the privacy background image to be a sensitive video frame.

It can be understood that the original video frame containing the privacy background image is taken as a sensitive video frame.

Figure 5:
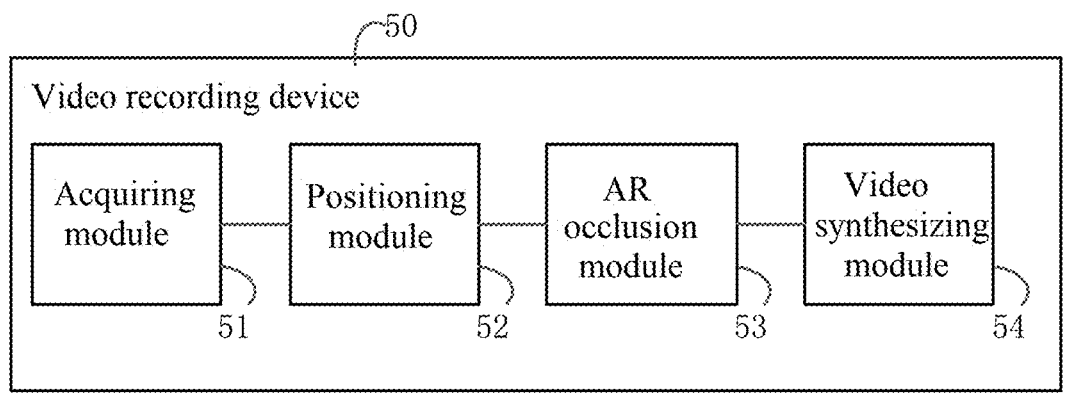
FIG. 5 is a schematic structural diagram of a video recording apparatus according to an embodiment of the present disclosure.

FIG. 5 is a schematic structural diagram of a video recording apparatus according to an embodiment of the present disclosure. The video recording device 50 shown in FIG. 5 mainly includes:

an acquiring module 51, configured to acquire a sensitive video frame containing a privacy background image from recorded video information;

a positioning module 52, configured to acquire an image region of the privacy background image in the sensitive video frame;

an AR occlusion module 53, configured to superimpose an augmented reality AR occlusion image on the image region of the privacy background image to obtain an occlusion frame in which the privacy background image is occluded;

a video synthesizing module 54, configured to obtain live video information according to the recorded video information and the occlusion frame.

The video recording device 50 of the embodiment shown in FIG. 5 is correspondingly used to perform the steps in the method embodiment shown in FIG. 2, and the implementation principle and technical effects are similar, and details are not described herein again.

Optionally, the AR occlusion module 53, before superimposing an augmented reality AR occlusion image on the image region of the privacy background image to obtain an occlusion frame in which the privacy background image is occluded, is further configured to:

determine a background type of the sensitive video frame according to a plurality of consecutive video frames including the sensitive video frame; acquire the AR occlusion image according to the background type.

Optionally, the AR occlusion module 53 is specifically configured to:

acquire surrounding color information of the privacy background image when determining that the background type is a dynamic background type; determine a hidden color according to the surrounding color information; acquire the AR occlusion image according to the hidden color, where a main color of the AR image is the hidden color.

Optionally, the AR occlusion module 53 is specifically configured to:

acquire an AR image a main color of which is the hidden color; process the AR image to obtain an AR occlusion image having an outer boundary shape that matches a contour shape of the image region.

Optionally, the AR occlusion module 53 is specifically configured to:

acquire a surrounding image of the privacy background image when determining that the background type is a static background type; determine a repeatable partial image in the surrounding image; taking the repeatable partial image, or a combined image of a plurality of the repeatable partial images to be an AR occlusion image.

Optionally, the acquiring module 51 is configured to:

parse the recorded video information to obtain at least one original video frame;

acquire a video background image in the at least one original video frame; acquire a privacy background image in the video background image; determine an original video frame corresponding to the privacy background image to be the sensitive video frame.

Optionally, the acquiring module 51 is specifically configured to:

acquire face information of a user; determine a face image corresponding to the face information in the at least one original video frame; determine a person image region corresponding to the face image in each of the original video frame according to the face image; determine the person image region to be a foreground image, and determine the remaining image region to be a video background image in each of the original video frame.

Optionally, the acquiring module 51 is specifically configured to:

perform semantic segmentation of object image on the video background image to obtain object semantic information; determine the object semantic information that is the same as privacy semantic information to be privacy object semantic information; determine an object image corresponding to the privacy object semantic information to be a privacy background image.

Optionally, before determining the object semantic information that is the same as the privacy semantic information to be privacy object semantic information, the acquiring module 51 is further configured to:

acquire a hidden instruction of a user history input, where the hidden instruction is used to indicate a new privacy background image; acquire historical privacy object semantic information corresponding to each of the new privacy background image; take the historical privacy object semantic information to be the privacy semantic information.

Correspondingly, before the acquiring the hidden instruction of the user history input, the acquiring module 51 is further configured to:

when the recorded video information is acquired, synchronously display the recorded video information to the user; when the hidden instruction input by the user for the video background image is received, determine an indicated image region corresponding to the hidden instruction to be a new privacy background image.

Figure 6:
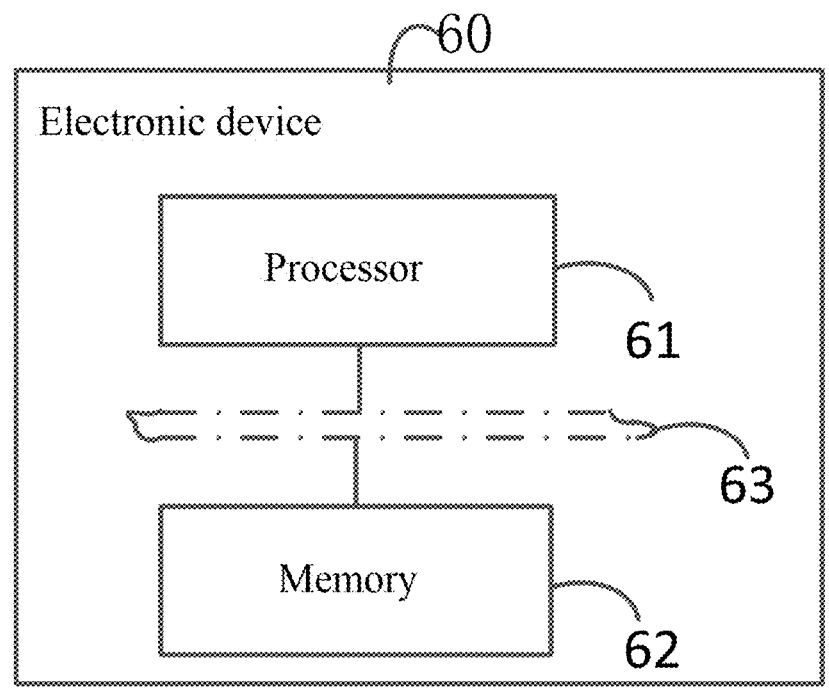
FIG. 6 is a schematic structural diagram of hardware of an electronic device according to an embodiment of the present disclosure.

FIG. 6 is a schematic diagram of a hardware structure of an electronic device according to an embodiment of the present disclosure. The electronic device 60 includes a processor 61, a memory 62, and a computer program.

The memory 62 is configured to store the computer program, and the memory may also be a flash memory. The computer program is, for example, an application program, a function module, or the like that implements the above method.

The processor 61 is configured to execute the computer program stored in the memory to implement the steps in the above method. For details, refer to the related description in the foregoing method embodiments.

Optionally, the memory 62 can be stand-alone or integrated with the processor 61.

When the memory 62 is a device independent of the processor 61, the electronic device 60 may further include:

a bus 63, configured to connect the memory 62 and the processor 61.

Figure 7:
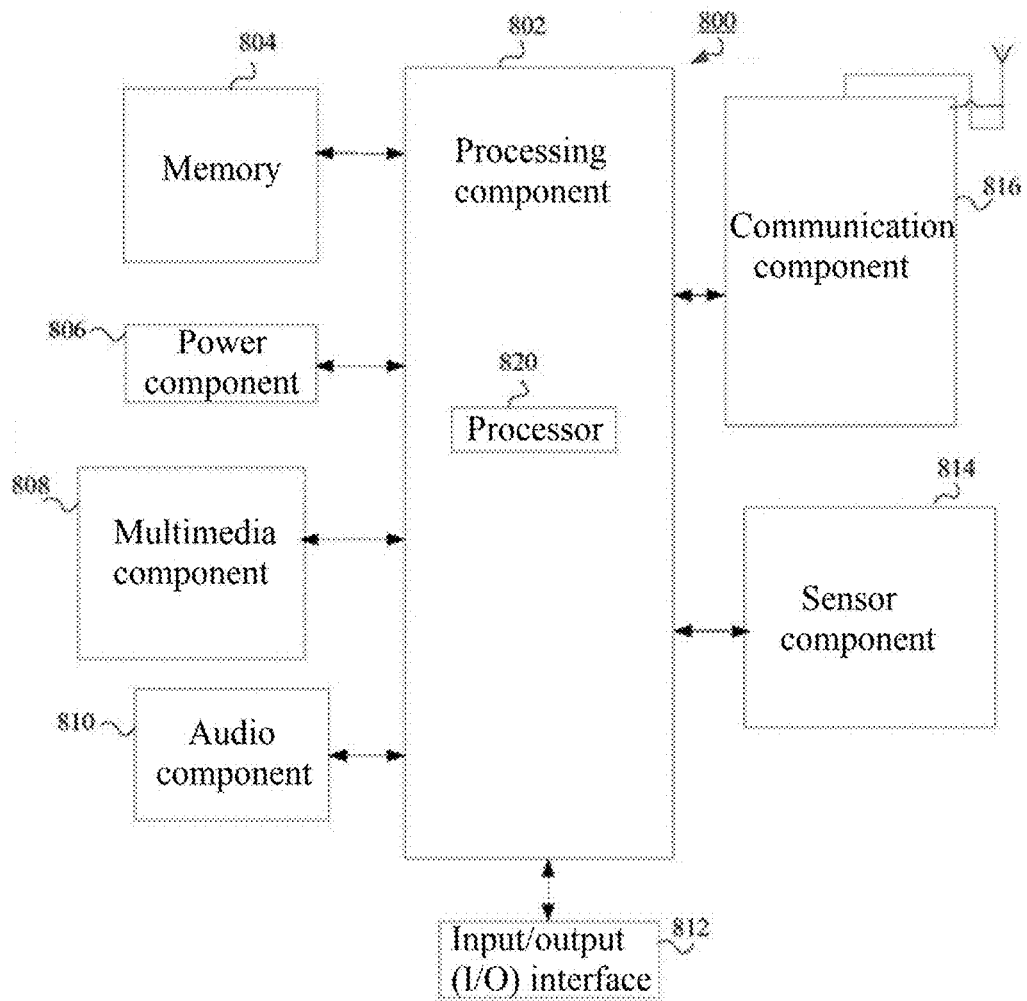
FIG. 7 is an example of the electronic device shown in FIG. 6 according to an embodiment of the present disclosure.

FIG. 7 is an example of the electronic device shown in FIG. 6 according to an embodiment of the present disclosure. On the basis of the embodiment shown in FIG. 6, the electronic device may specifically be the terminal device 800 as shown in FIG. 7. For example, the terminal device 800 can be a mobile phone, a computer, a digital broadcast terminal, a messaging device, a game console, a tablet device, a medical device, a fitness device, a personal digital assistant, and the like.

Referring to FIG. 7, the terminal device 800 can include one or more of the following components: processing component 802, memory 804, power component 806, multimedia component 808, audio component 810, input/output (I/O) interface 812, sensor component 814, and communication component 816.

The processing component 802 typically controls the overall operation of electronic device 800, such as operations associated with display, telephone calls, data communications, camera operations, and recording operations. The processing component 802 can include one or more processors 820 to execute instructions to perform all or part of the steps of the above methods. Moreover, the processing component 802 can include one or more modules to facilitate interaction between the processing component 802 and other components. For example, the processing component 802 can include a multimedia module to facilitate interaction between the multimedia component 808 and the processing component 802.

The memory 804 is configured to store various types of data to support operation at the electronic device 800. Examples of such data include instructions for any application or method operating on the electronic device 800, contact data, phone book data, messages, pictures, videos, and the like. The memory 804 can be implemented by any type of volatile or non-volatile storage device, or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or optical disk.

The power component 806 provides power to various components of the electronic device 800. The power component 806 can include a power management system, one or more power sources, and other components associated with generating, managing, and distributing power for the electronic device 800.

The multimedia component 808 includes a screen between the electronic device 800 and a user that provides an output interface. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor may sense not only the boundary of the touch or slide action, but also the duration and pressure associated with the touch or slide operation. In some embodiments, the multimedia component 808 includes a front camera and/or a rear camera. When the electronic device 800 is in an operation mode, such as a shooting mode or a video mode, the front camera and/or the rear camera can receive external multimedia data. Each front and rear camera can be a fixed optical lens system or have focal length and optical zoom capabilities.

The audio component 810 is configured to output and/or input an audio signal. For example, the audio component 810 includes a microphone (MIC) that is configured to receive an external audio signal when the electronic device 800 is in an operation mode, such as a call mode, a recording mode, and a voice recognition mode. The received audio signal may be further stored in memory 804 or transmitted via communication component 816. In some embodiments, the audio component 810 also includes a speaker for outputting an audio signal.

The I/O interface 812 provides an interface between the processing component 802 and the peripheral interface module, which may be a keyboard, a click wheel, a button, or the like. These buttons may include, but are not limited to, a home button, a volume button, a start button, and a lock button.

The sensor component 814 includes one or more sensors for providing electronic device 800 with a status assessment of various aspects. For example, the sensor component 814 can detect an on/off state of the electronic device 800, relative positioning of components, such as the display and keypad of the electronic device 800, and the sensor component 814 can also detect a change in the position of the electronic device 800 or a component of electronic device 800, the presence or absence of user's contact on the electronic device 800, the orientation or acceleration/deceleration of the electronic device 800, and the temperature change of the electronic device 800. The sensor component 814 can include a proximity sensor configured to detect the presence of nearby objects without any physical contact. The sensor component 814 may also include a light sensor, such as a CMOS or CCD image sensor, for use in imaging applications. In some embodiments, the sensor component 814 can also include an acceleration sensor, a gyro sensor, a magnetic sensor, a pressure sensor, or a temperature sensor.

The communication component 816 is configured to facilitate wired or wireless communication between the electronic device 800 and other devices. The electronic device 800 can access a wireless network based on a communication standard, such as WiFi, 2G or 3G, or a combination thereof. In an exemplary embodiment, the communication component 816 receives broadcast signals or broadcast associated information from an external broadcast management system via a broadcast channel In an exemplary embodiment, the communication component 816 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In an exemplary embodiment, the electronic device 800 may be implemented by one or more application specific integrated circuits (ASICs), digital signal processors (DSPs), digital signal processing devices (DSPDs), programmable logic devices (PLDs), field programmable gate arrays (FPGA), controller, microcontroller, microprocessor, or other electronic components for performing the above methods.

The present disclosure also provides a readable storage medium, a computer program is stored in the readable storage medium, and the computer program is used to, when executed by the processor, implement the video recording method provided by the various embodiments described above.

The readable storage medium may be a computer storage medium or a communication medium. Communication media includes any medium that facilitates the transfer of a computer program from one location to another. The computer storage medium can be any available media that can be accessed by a general purpose or special purpose computer. For example, a readable storage medium is coupled to the processor, such that the processor can read information from the readable storage medium and can write information to the readable storage medium. Of course, the readable storage medium can also be an integral part of the processor. The processor and the readable storage medium may be located in an Application Specific Integrated Circuit (ASIC). Additionally, the ASIC can be located in the user equipment. Of course, the processor and the readable storage medium can also reside as discrete components in the communication device. The readable storage medium can be a read only memory (ROM), a random access memory (RAM), a CD-ROM, a magnetic tape, a floppy disk, and an optical data storage device.

The present disclosure also provides a program product, the program product includes execution instructions stored in a readable storage medium. At least one processor of the device can read the execution instructions from the readable storage medium, and the at least one processor executes the execution instructions to cause the device to implement the methods provided by the various embodiments described above.

In the above embodiment of the electronic device, it should be understood that the processor in the embodiments of the present disclosure may be a central processing unit (CPU for short), or may be other general purpose processors, a digital signal processor (DSP for short), an application specific integrated circuit (ASIC for short), etc. The general purpose processor may be a microprocessor or the processor may be any conventional processor or the like. The steps of the method disclosed in the embodiments of the present disclosure may be directly implemented as being performed by a hardware processor, or may be performed by a combination of hardware and software modules in the processor.

It should be noted that the above embodiments are only used to explain the technical solution of the present disclosure and shall not be construed as limitation; although the present disclosure has been described in detail with reference to the foregoing embodiments, those skilled in the art will understand that the technical solutions described in the foregoing embodiments may be modified, or some or all of the technical features may be equivalently substituted; and the modifications or substitutions do not deviate from the scope of the technical solutions of the embodiments of the present disclosure.

What is claimed is:

1. A video recording method, comprising:
   acquiring a sensitive video frame containing a privacy background image from recorded video information;
   acquiring an image region of the privacy background image in the sensitive video frame;
   superimposing an augmented reality (AR) occlusion image on the image region of the privacy background image to obtain an occlusion frame in which the privacy background image is occluded; and
   obtaining live video information according to the recorded video information and the occlusion frame;
   wherein before the superimposing an augmented reality AR occlusion image on the image region of the privacy background image to obtain an occlusion frame in which the privacy background image is occluded, the method further comprises:
   determining a background type of the sensitive video frame according to a plurality of consecutive video frames including the sensitive video frame, wherein the background type is determined from a dynamic background type and a static background type; and
   acquiring the AR occlusion image according to the background type.

2. The method according to claim 1, wherein the acquiring the AR occlusion image according to the background type comprises:
   acquiring surrounding color information of the privacy background image when determining that the background type is the dynamic background type;
   determining a hidden color according to the surrounding color information; and
   acquiring the AR occlusion image according to the hidden color, with a main color of the AR image being the hidden color.

3. The method according to claim 2, wherein the acquiring the AR occlusion image according to the hidden color, with a main color of the AR image being the hidden color, comprises:
   acquiring an AR image a main color of which is the hidden color; and
   processing the AR image to obtain an AR occlusion image that has an outer boundary shape matching a contour shape of the image region.

4. The method according to claim 1, wherein the acquiring the AR occlusion image according to the background type comprises:
   acquiring a surrounding image of the privacy background image when determining that the background type is the static background type;
   determining a repeatable partial image in the surrounding image; and
   taking the repeatable partial image, or a combined image of a plurality of the repeatable partial images to be the AR occlusion image.

5. The method according to claim 1, wherein the acquiring a sensitive video frame containing a privacy background image from recorded video information comprises:
   parsing the recorded video information to obtain at least one original video frame;
   acquiring a video background image in the at least one original video frame;
   acquiring the privacy background image in the video background image; and
   determining an original video frame corresponding to the privacy background image to be the sensitive video frame.

6. The method according to claim 5, wherein the acquiring a video background image in the at least one original video frame comprises:
   acquiring face information of a user;
   determining a face image corresponding to the face information in the at least one original video frame;
   determining a person image region corresponding to the face image in each of the original video frame according to the face image; and
   determining, in each of the original video frame, the person image region to be a foreground image, and determining a remaining image region to be a video background image.

7. The method according to claim 5, wherein the acquiring the privacy background image in the video background image comprises:
   performing semantic segmentation of object image on the video background image to obtain object semantic information;
   determining the object semantic information that is the same as privacy semantic information to be privacy object semantic information; and
   determining an object image corresponding to the privacy object semantic information to be the privacy background image.

8. The method according to claim 7, wherein before the determining the object semantic information that is the same as the privacy semantic information to be privacy object semantic information, the method further comprises:
   acquiring a hidden instruction of a user history input, wherein the hidden instruction is used to indicate a new privacy background image;
   acquiring historical privacy object semantic information corresponding to each of the new privacy background image;
   taking the historical privacy object semantic information to be the privacy semantic information;
   correspondingly, before the acquiring a hidden instruction of a user history input, the method further includes:
   when the recorded video information is acquired, synchronously displaying the recorded video information to a user; and
   when the hidden instruction input by the user for the video background image is received, determining an indicated image region corresponding to the hidden instruction to be the new privacy background image.

9. A video recording device, comprising: a memory, a processor, and a computer program, wherein the computer program is stored in the memory, and the processor runs the computer program to:
acquire a sensitive video frame containing a privacy background image from recorded video information;
acquire an image region of the privacy background image in the sensitive video frame;
superimpose an augmented reality (AR) occlusion image on the image region of the privacy background image to obtain an occlusion frame in which the privacy background image is occluded; and
obtain live video information according to the recorded video information and the occlusion frame;
wherein before superimposing an augmented reality AR occlusion image on the image region of the privacy background image to obtain an occlusion frame in which the privacy background image is occluded, the processor runs the computer program further to:
determine a background type of the sensitive video frame according to a plurality of consecutive video frames including the sensitive video frame, wherein the background type is determined from a dynamic background type and a static background type; and
acquire the AR occlusion image according to the background type.

10. The device according to claim 9, wherein the processor runs the computer program further to:
acquire surrounding color information of the privacy background image when determining that the background type is the dynamic background type; determine a hidden color according to the surrounding color information; acquire the AR occlusion image according to the hidden color, with a main color of the AR image being the hidden color.

11. The device according to claim 10, wherein the processor runs the computer program further to:
acquire an AR image a main color of which is the hidden color; process the AR image to obtain an AR occlusion image having an outer boundary shape that matches a contour shape of the image region.

12. The device according to claim 9, wherein the processor runs the computer program further to:
acquire a surrounding image of the privacy background image when determining that the background type is the static background type; determine a repeatable partial image in the surrounding image; taking the repeatable partial image, or a combined image of a plurality of the repeatable partial images to be the AR occlusion image.

13. The device according to claim 9, wherein the processor runs the computer program further to:
parse the recorded video information to obtain at least one original video frame; acquire a video background image in the at least one original video frame; acquire the privacy background image in the video background image; determine an original video frame corresponding to the privacy background image to be the sensitive video frame.

14. The device according to claim 13, wherein the processor runs the computer program further to:
acquire face information of a user; determine a face image corresponding to the face information in the at least one original video frame; determine a person image region corresponding to the face image in each of the original video frame according to the face image; determine the person image region to be a foreground image, and determine a remaining image region to be a video background image in each of the original video frame.

15. The device according to claim 13, wherein the processor runs the computer program further to:
perform semantic segmentation of object image on the video background image to obtain object semantic information; determine the object semantic information that is the same as privacy semantic information to be privacy object semantic information; determine an object image corresponding to the privacy object semantic information to be the privacy background image.

16. The device according to claim 15, wherein before the determining the object semantic information that is the same as the privacy semantic information to be privacy object semantic information, the processor runs the computer program further to:
acquire a hidden instruction of a user history input, wherein the hidden instruction is used to indicate a new privacy background image; acquire historical privacy object semantic information corresponding to each of the new privacy background image; take the historical privacy object semantic information to be the privacy semantic information; and
correspondingly, before the acquiring a hidden instruction of a user history input, the processor runs the computer program further to:
when the recorded video information is acquired, synchronously display the recorded video information to a user; when the hidden instruction input by the user for the video background image is received, determine an indicated image region corresponding to the hidden instruction to be the new privacy background image.

17. A non-transitory readable storage medium, wherein a computer program is stored in the readable storage medium, and the computer program, when executed by a processor, is used to implement a video recording method according to claim 1.

* * * * *